Patented Sept. 8, 1953

2,651,640

UNITED STATES PATENT OFFICE 2,651,640

4-AMINO AND 4-CHLORO PHENYL-2-THIENYL KETONES

Franz Marschall, Easton, Pa., assignor to General Aniline & Film Corporation, New York, N. Y., a corporation of Delaware No Drawing. Application December 15, 1948, Serial No. 65,538

2 Claims. (Cl. 260—332.3)

1

This invention relates to 4-aminophenyl-2-thienyl ketone and process of preparing the same.

I have discovered that 4-aminophenyl-2-thienyl ketone is a valuable intermediate in the preparation of diazo dye stuffs since as an amine it can readily be diazotized and the diazo solution couples readily with such intermediates as J Acid (2 amino-5 naphthol-7 sulfonic acid) to yield a tan azo dye; G Salt (2 naphthol-6,8 disulfonic acid disodium salt) to yield an orange azo dye; R Salt (2 naphthol-3,6 disulfonic acid disodium salt) to yield a red-orange azo dye; H Acid (1 amino-8 naphthol-3.6 disulfonic acid) to yield a violet azo dye; 1 naphthol-3 sulfonic acid, to yield an orange-tan azo dye, etc.

This novel compound, 4-aminophenyl-2-thienyl ketone may readily be prepared in good yield by first condensing thiophene with p-chlorbenzoyl chloride and then treating the thus obtained 4-chlorophenyl-2-thienyl-ketone with ammonium hydroxide in the presence of copper sulphate. These reactions may be formulated as follows:

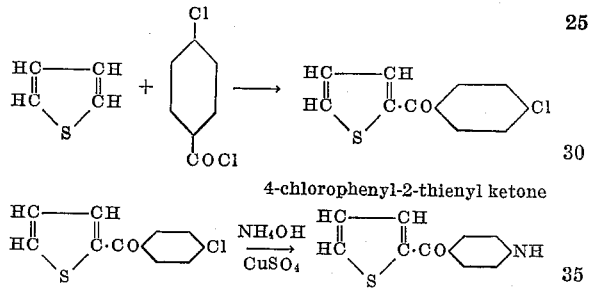

4-chlorophenyl-2-thienyl ketone

The following is a detailed description of the synthesis of 4-aminophenyl-2-thienyl ketone by the above series of reactions.

A 1-liter flask, equipped with thermometer, stirrer and condenser was charged with 100 grams aluminum chloride and 300 grams of carbon disulfide. The flask was kept in cold running water in order to maintain the temperature of its contents at 20–25° C. during the dropwise addition, over a period of 3–3½ hours while stirring thoroughly, of a mixture of 60 grams of thiophene, 130.8 grams p-chlorbenzoyl chloride and 225 grams of carbon disulfide. On completion of this addition, the flask was removed from the water bath and its contents stirred for 1–2 hours. The charge was then heated to reflux and refluxed for one to two hours, at which time the evolution of HCl had ceased. The contents of the flask were then poured into cold water with stirring and the carbon disulfide removed by distillation. The thus obtained 4-chlorophenyl-2-thienyl ketone was recovered by filtration, washed with water and dried. If desired, it can also be extracted with ether.

The thus obtained 4-chlorophenyl-2-thienyl ketone was a white material with a melting point of 100.6 to 101.2° C. and was then treated with ammonium hydroxide in the following manner:

A stainless steel autoclave was charged with 0.5 mol (111.7 grams) of 4-chlorophenyl-2-thienyl ketone, 5.0 mols ammonium hydroxide and 12 grams of cupric sulfate .5 H₂O. This mixture was then heated to 215° C. while stirring and stirred at this temperature for 10 hours. At the end of this time the insoluble base was recovered by filtration from alkaline copper solution, dissolved in boiling acetone, filtered and the acetone removed by evaporation. The residue was then dissolved in 15% HCl by heating and the thus obtained amine hydrochloride solution filtered and neutralized to obtain the free base. The pure 4-aminophenyl-2-thienyl ketone was obtained by re-crystallization from alcohol and was an almost white material with a melting point of 120.5 to 122.1° C. The thus obtained product could readily be diazotized by conventional procedures and the diazo solution coupled readily with a wide variety of intermediates.

I claim:
1. 4-aminophenyl-2-thienyl ketone.
2. 4-chlorophenyl-2-thienyl ketone.

FRANZ MARSCHALL.

References Cited in the file of this patent

Thomas: Anhydrous Aluminum Chloride, p. 231.

Beilstein's Handbuch der Organischen Chemie, p. 81, Springer, Berlin 1931.

Weygand: "Organic Preparations," p. 207, Interscience, N. Y., 1945.

Thomas: "Anhydrous Aluminum Chloride," pp. 230, 371, Reinhold, N. Y., 1941.

Whitmore: "Organic Chemistry," p. 893, Von Nostrand, N. Y., 1937.

Bernthsen and Sudborough: "Organic Chemistry," p. 549, Von Nostrand, N. Y., 1922 edition.

Powers: Advancing Fronts in Chemistry, vol. II, p. 33, Reinhold Publ. Co. N. Y., 1946.